No. 11,834. Reissued June 26, 1900.

J. T. SENG.

LID RAISING MECHANISM FOR BOX COUCHES.

(Application filed Feb. 26, 1900.)

2 Sheets—Sheet 1.

Witnesses:
Arthur M. Nyman
C. F. Duvall

Inventor:
Julius T. Seng,
by W. J. Duvall
Attorney.

No. 11,834. Reissued June 26, 1900.

J. T. SENG.

LID RAISING MECHANISM FOR BOX COUCHES.

(Application filed Feb. 26, 1900.)

2 Sheets—Sheet 2.

Witnesses:
Arthur M. Hyman
C. F. Durell

Inventor:
Julius T. Seng
by W. J. Duvall. Attorney

UNITED STATES PATENT OFFICE.

JULIUS T. SENG, OF CHICAGO, ILLINOIS, ASSIGNOR TO THE SENG COMPANY, OF SAME PLACE.

LID-RAISING MECHANISM FOR BOX-COUCHES.

SPECIFICATION forming part of Reissued Letters Patent No. 11,834, dated June 26, 1900.

Original No. 635,605, dated October 24, 1899. Application for reissue filed February 26, 1900. Serial No. 6,588.

*To all whom it may concern:*

Be it known that I, JULIUS T. SENG, a citizen of the United States, residing at Chicago, in the county of Cook and State of Illinois, have invented new and useful Improvements in Lid-Raising Mechanisms for Box-Couches, of which the following is a specification.

My invention relates to improvements in lid-raising mechanism for box-couches and the like, wherein the conventional hinges are omitted and the lid in its operations of opening and closing is caused to move away from the wall, thereby avoiding the necessity of withdrawing the couch bodily from the wall preliminary to a raising or lowering of the lid. Numerous arrangements of more or less practicability have been heretofore produced for this purpose, the same usually consisting of a system of levers or links independently pivoted to the lid and to the receptacle portion of the couch and requiring more or less nicety of adjustment in their application to the couch by the couch maker or manufacturer, whereby a great number of measurements must be taken, thus tending to increase the cost of the manufacture of the completed article.

My invention has a twofold object in view—namely, to produce a cheap, simple, and practicable lid-operating mechanism of the character and for the purpose described and to produce a convenient means of expeditiously applying the same and all other mechanisms of a like nature to box-couches and similar articles, thereby avoiding the expense usually attending the application of these devices now so universally employed.

With the above main objects in view the invention consists, first, in a particular spring-controlled arrangement of links or levers; second, in a plate for conveniently and expeditiously securing the same and other like mechanisms to the lid, and, third, in a plate also adapted to coöperate with the springs aforesaid, all as will hereinafter appear and be particularly pointed out in the claims.

Figure 1:
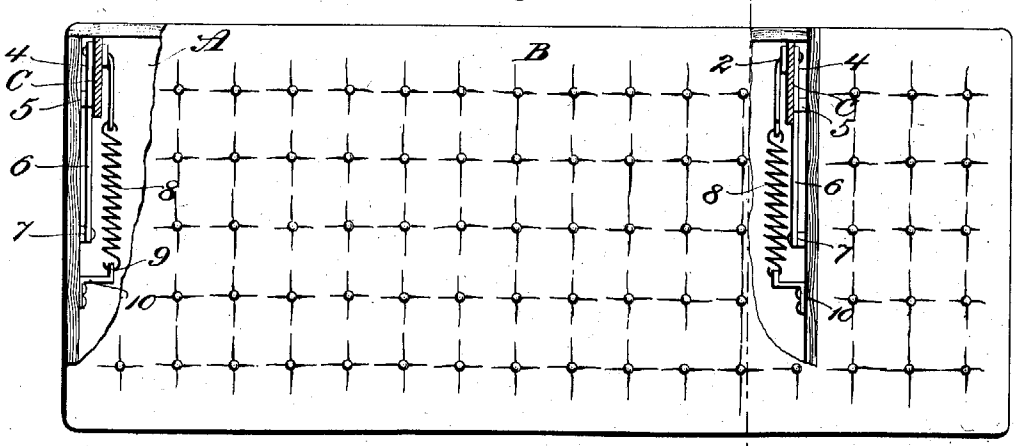
Figure 2:
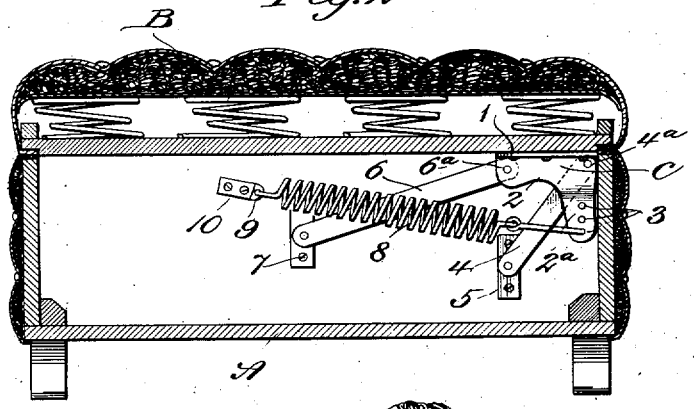
Figure 3:
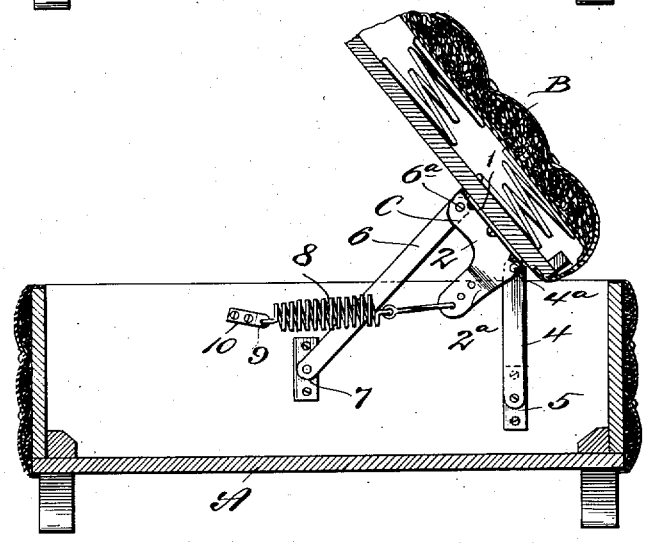

Referring to the drawings, Figure 1 is a top plan view of a box-couch provided with my invention, the upholstered lid of the couch being broken away for the purpose of exposing the same to view. Fig. 2 is a transverse sectional view on the line 2 2 of Fig. 1. Fig. 3 is a view similar to Fig. 2, the parts being in the position they occupy when the lid is raised.

Similar characters of reference indicate similar parts in all the figures of the drawings.

In the drawings, A indicates the receptacle or box portion of a couch, and B the upholstered lid of an ordinary form of box-couch.

Secured by screws upon the under side of the lid B, adjacent to its ends and near its rear edge, are two securing-plates C. These plates C are preferably angular in cross-section, each having a securing-flange 1, perforated to receive screws, by means of which the plates are secured in position, and a depending flange 2, which may or may not be continued to form a reduced depending tongue $2^a$ and which when employed is preferably offset and provided with a series of perforations 3.

A pair of links 4 are pivotally secured at their upper ends, as at $4^a$, to the rear ends of the flanges 2, and at their lower ends the said links may be pivotally secured to the end walls of the box or receptacle portion of the couch, or, as herein shown, to a bearing-plate 5, the latter mounted upon the end walls of the receptacle portion and secured thereto in any suitable manner and located in advance of the upper pivoted ends of said links when the lid is closed.

A pair of front links 6, preferably somewhat longer than the links 4, have their upper ends pivoted, as at $6^a$, to the front ends of the flanges 2, the lower ends of said front links being pivotally connected to the end walls of the receptable portion of the couch, or, as herein shown, to plates 7, secured to said ends walls, located in advance of the plates 5 and preferably some distance higher.

By means of the arrangement described it will be apparent that the plates C, and consequently the lid B, will turn upon the end portions of both links as pivots, while the links will turn upon their bearings 5 and 7. This compound movement of the plate C causes the rear end thereof to move in an arc which diverges only slightly from a horizontal line, while the forward end of said plate C moves in two arcs, one having its center coincident with the pivotal connection between the links 6 and 7 and the other having its center coinciding with the pivotal connections between the plates C and the links 4. The latter, however, being a moving center, the arc described therefrom will coincide with the arc described by the link 6. In this manner the plate C while turning on its pivots also moves toward the front end or side of the couch, thus drawing the cover B sufficiently forward to prevent its rear edge from contacting with the adjacent wall of a room, against which couches usually stand.

The perforations 3 in the offset tongue 2 serve as means for connecting one end of a coiled spring with said tongue. In the drawings I have indicated a spring 8, connected at one end with said tongue 2 and at its other end with an angular bracket 9, provided with a perforated securing end 10, through which screws pass for the purpose of attaching the bracket to the end wall of the box portion or receptacle of the couch adjacent to the plate 7 and preferably slightly higher than the same. Of course it will be understood that a companion spring is employed at the opposite end of the couch, the connections of the two corresponding.

It will be observed that the springs are normally at a tension when the cover is lowered to a closed position, and owing to the fact that the direction of draft of said springs falls below the pivotal connections of the plates C said springs tend to raise said couch-lid. The combined strength of the springs, however, is not sufficient to actually raise the lid, which latter operation can only be accomplished after an initial or partial raising of the lid by hand, the springs aiding in the operation and continuing the same subsequently thereto. During the upward movement of the lid the springs are constantly contracting, and therefore exerting less power, yet at the same time the leverage of the tongues is constantly increasing and the center of gravity of the plates C shifting, so that the counteracting forces practically preserve their proper relative ratios. These forces—namely, the weight of the cover or lid B and the power of the springs 8—are so adjusted as to give a very slight preponderance to the springs, so as to avoid a violent opening of the lid and enable the latter to be closed by a slight pressure thereon. The degree of preponderance of the springs can be regulated by connecting the springs in the different perforations 3 in the tongue 2.

The employment of the plate C is one of the main features of my invention and is of very great importance to the practicability of the device in that it is intended, preferably, to market the devices with the upper ends of the links permanently and pivotally connected to the securing-plates, for the reason, first, that it facilitates handling, &c., and, second, it greatly aids the couch-maker in quickly applying the same, avoiding any experimenting or great amount of measuring to get the device properly positioned, thus saving time in this regard and greatly tending to cheapen their application.

By the term "members" as employed in the claims I mean links or levers or combinations of the same, this term being employed as synonymous.

Having described my invention, what I claim is—

1. The combination with a box-couch; of a pair of plates secured to the under side and near the opposite ends of the lid thereof; a pair of rear members pivoted at their upper ends to the rear ends of the plates, and at their lower ends pivoted in advance thereof in the box or receptacle portion of the couch; a pair of front members pivoted at their upper ends to the front ends of the plates and at their lower ends within the box or receptacle portion of the couch in advance of the lower members; and coiled springs connected to fixed points within the box or receptacle portion of the couch and at their rear ends to said plates.

2. The combination with a box-couch; of opposite plates secured to the under side near the opposite ends of the lid, the said plates each being provided with a downwardly-depending tongue; a pair of rear members pivoted at their upper ends to the rear ends of the plates and at their lower ends pivoted in advance thereof in the box or receptacle portion of the couch; a pair of front members pivoted at their upper ends to the front ends of the plates and at their lower ends to the box or receptacle portion of the couch in advance of the rear members; and opposite coiled springs connected to the end walls of the couch at their front ends and at their rear ends to the depending tongues of the said plates.

3. The combination with a box-couch; of opposite plates secured to the under side and near the opposite ends thereof, each provided with a depending tongue having a series of perforations; a pair of rear members pivoted at their upper ends to the upper ends of the plates and at their lower ends journaled in the box or receptacle portion of the couch in advance of the points of pivot with the said plates; a pair of front members pivoted at their upper ends to the front ends of the plates and at their lower ends to the box or receptacle portion of the couch in advance of the pivotal points of the rear members; and opposite coiled springs removably engaging the perforations in the tongues and at their front ends provided with securing-brackets secured to the end walls of the receptacle portion of the couch above and in advance of the lower ends of the front members.

4. The combination with a box-couch; of opposite plates secured to the couch-lid near its ends; links connected at their upper ends to the rear corners of the plates and journaled at their lower ends in the box or receptacle portion of the couch in advance of their upper pivotal points; links of greater length than the first mentioned connected pivotally at their upper ends to the front ends of the said plates and at their lower ends journaled in the box or receptacle portion of the couch in advance of the rear links, said links being at an angle to but not crossing each other, whereby said plates and cover will move in two arcs; and a pair of coiled springs connected at their rear ends to the plates and at their front ends to the end walls of the box or receptacle portion of the couch and extending transversely to one of said link connections and adjacent the other thereof.

5. The combination with a box-couch; of a pair of securing-plates secured to the under side of the lid near its ends; a pair of rear members pivoted at their upper ends to the securing-plates and at their lower ends within the box or receptacle portion of the couch in advance of their upper pivotal points; a pair of front members pivoted to the plates in advance of the points of pivot with the rear members and to the box or receptacle portion of the couch; and coiled springs arranged with relation to said members so as to be under tension but out of active position when the lid is lowered or closed and adapted to become active and to aid in a raising of the lid subsequent to an initial impulse given thereto.

6. The combination, in a lid-opening mechanism for box-couches, of a securing-plate adapted to be applied to the under side of a couch-lid, and a system of lid raising or operating members permanently and pivotally secured at their upper ends to said plate and adapted at their lower ends to be pivotally secured to the receptacle portion of the couch.

7. The combination, in a lid-opening mechanism for box-couches, of a securing-plate adapted to be applied to the under side of a couch-lid, a system of lid raising or operating members permanently and pivotally secured at their upper ends to said plate and adapted at their lower ends to be pivotally secured to the receptacle portion of said couch, and an actuating-spring for said members also carried by said plate.

8. The combination with a box-couch; of opposite angular securing-plates the under sides of which form depending flanges, the upper sides of the same forming securing-flanges screwed to the said lid on its under side and near its ends; a pair of rear members pivoted at their lower ends in the receptacle portion of the couch and at their upper ends pivoted in rear thereof to the rear ends of the said depending flanges; a pair of front members, pivoted at their lower ends in said receptacle portion and at their upper ends to the front ends of the depending flanges aforesaid, whereby the lid will, at its rear end, move forward as raised; and a pair of coiled springs normally under tension but ineffective when the lid is lowered and adapted to become effective and to aid in a raising of the lid subsequent to an initial raising of the same by hand.

In testimony whereof I have signed my name to this specification in the presence of two subscribing witnesses.

JULIUS T. SENG.

Witnesses:
G. J. BICHL,
F. J. SENG.